United States Patent Office 3,079,798
Patented Mar. 5, 1963

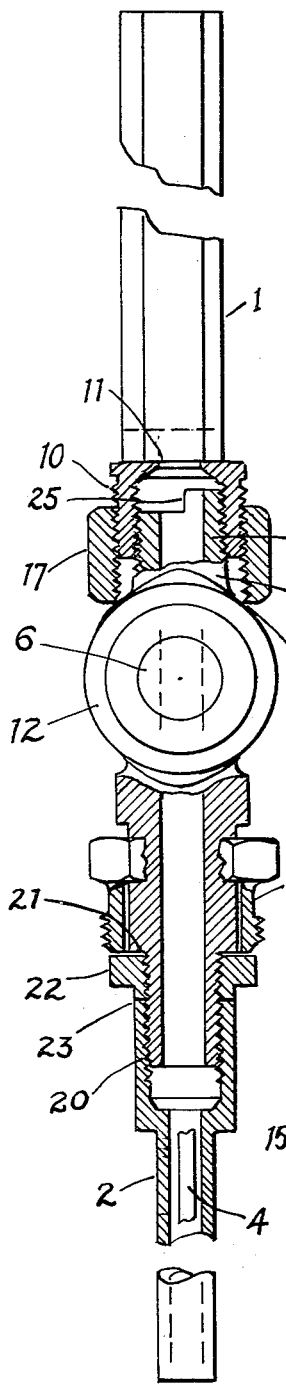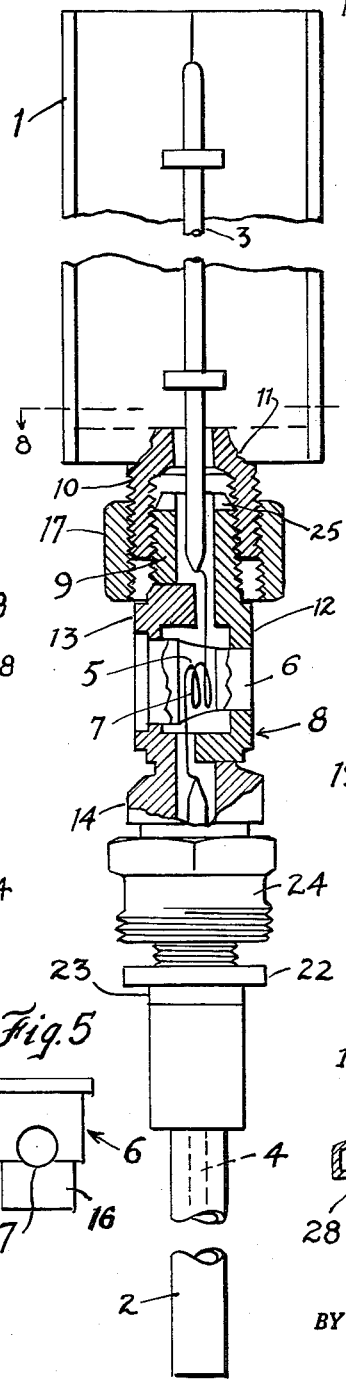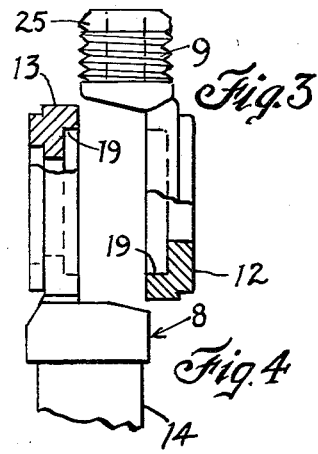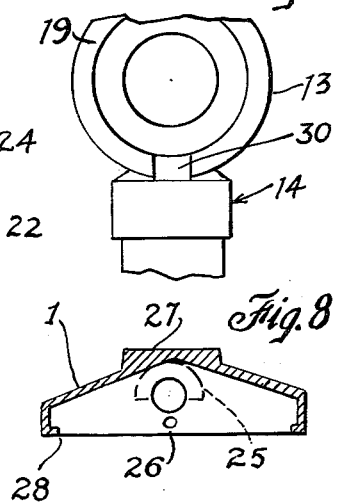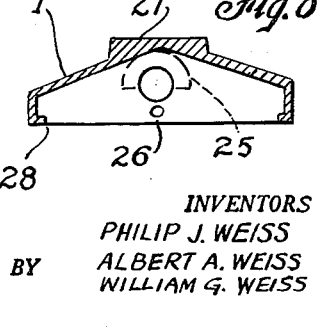

3,079,798
INDUSTRIAL THERMOMETER
Philip J. Weiss, Baldwin, Albert A. Weiss 3rd, Lynbrook, and William G. Weiss, Brooklyn, N.Y.
Filed Dec. 21, 1959, Ser. No. 860,823
2 Claims. (Cl. 73—368)

Our invention relates to an improvement in thermometers; especially thermometers for industrial use, adapted to be adjustably mounted, so that degrees of heat can be observed thereon to the best advantage.

An important object of the invention is to provide a readily adjustable thermometer, for use in manufacturing and other installations, of rugged construction and compact in formation, with all necessary parts well encased and protected against damage by prying or mishandling.

A further object is to provide an adjustable thermometer which is simple in design, comprising relatively few parts, all easy to assemble and manipulate, and capable of production at relatively low cost.

Another object of the invention is to provide a thermometer having a stem which can be placed upright or at a slant on a piece of equipment; including a casing which can be arranged vertically and likewise turned to face to either side, as may be necessary.

These and other objects and advantages of our invention are described fully in the ensuing specification, and the novel characteristics of our improved thermometer are defined in the appended claims. An embodiment of our invention is set forth in the drawings; but this disclosure is by way of example only, and various changes in structural respects may be made in practice without departing from the principle of the invention or altering the general plan in which the invention resides.

FIGURE 1 is a side view of our improved thermometer with all the parts in the central position partly in section to show the construction of the various members.

FIGURE 2 is a front view of the thermometer with the various members thereof likewise in section.

FIGURE 3 is a side view of one of the members by which our improved thermometer can be mounted.

FIGURE 4 is a similar view of another member.

FIGURES 5, 6 and 7 are detail views of some of the parts; and

FIGURE 8 is a cross section on line 8—8 of FIGURE 2.

On the drawings, the numeral 1 indicates the case of a thermometer, and numeral 2 the stem, which is inserted into a boiler, pipe, or other piece of apparatus enclosing a heat-bearing medium, the temperature of which is to be watched. A length of tubing indicated at 3 (FIGURE 2) is supported in the case 1 and another tubular section 4 is located in the stem 2, the two sections being united and in free communication with each other by way of a small coil of capillary tubing 5. These sections 3 and 4 contain the required quantity of heat responsive liquid, such as mercury or some other suitable substance, to register temperatures.

As illustrated, the structure of the thermometer includes a transverse pivot plug or journal 6 about which the case and other parts can be rotated; and said plug has a bore 7 in which the flexible capillary coil 5 is housed; this bore or aperture being in line with the case 1. The tube sections 3 and 4 are situated in the case 1 and the stem 2, and for all relative positions of the tubes 3 and 4 these tubes remain operatively connected by the coil 5.

Connected to the casing 1 is a member 8 having hollow boss or neck 9 at one end with exterior threads; and the case 1 has at its adjacent lower end a similar tubular boss or neck 10 with inside threads 11, so that the fitting or member 8 can be attached to the case by screwing the boss 9 into the boss 10.

The opposite end of the fitting 8 has a flat portion or head 12 offset to one side of the long axis of this fitting, and this flat head is secured to a similar flat head 13 laterally offset on another hollow fitting 14. Both heads are perforated and are connected in pivotal relation by the pivot plug 6. The opening in the head 13 is larger than the opening in the head 12, and the plug 6 has portions 15 and 16 which fit into the openings of the two heads accordingly. The head 13 is pivotally mounted on the large section 15 of the plug, and the head 12 is fixed to the other or smaller section 16 of this plug. The boss 10 on the thermometer case carries a lock-nut or sleeve 17 which engages the outside threads on the boss 10, similar to the inside threads 11. This nut has a projecting rim 18 and can be screwed down so as to make tight contact with the rims of the heads 12 and 13, and hold the head 12 and case 1 in any adjusted rotary position with respect to the head 13. The heads 12 and 13 have rims 19 on their adjacent faces and these rims enclose the pin or plug 6 in which the coil 5 is housed. The plug 6 has a tight press fit in the head 12 and is rigid with this head, but can turn freely in the head 13.

The upper end of the stem 2 of the thermometer which carries the tube 4 is enlarged and is threaded inside to engage a threaded extension or boss 20 at the lower end of the member or fitting 14.

The boss 20 has a shoulder 21, and the threads thereon receive a collar 22 which abuts the shoulder 21. This collar has a small annular projection or neck 23 with which the enlarged upper end of the stem 2 makes contact when the parts are all in place. Between the collar and the end of the fitting which carries the head 13, is a loosely fitting bushing 24 which has threads on its outside, and the upper end of this bushing has a nut-shaped rim to enable it to be turned. The threads on this bushing serve to engage the usual socket member (not shown) which is mounted in a boiler or some other heated equipment and in which the thermometer is affixed. The tube element 4 is fixed in the usual way in the stem, and may extend therefrom to a point in the boss 20 near the pivot plug 6, and the element 3 is made fast in the case 1, and extends into the boss 10, nearly to the plug 6. The case 1 may have the conventional shape, angular in cross section.

It will be noted that the coil of the capillary tube 5 is entirely enclosed in the two heads 12 and 13, and when the case is adjusted so as to rotate the head 12, the coil 4 is moved with this head and plug 6, but as the coil is flexible this adjustment is of course allowable. When the case is turned about its long axis with respect to the heads 12 and 13, the coils of the tubing 5 permit twisting to a sufficient extent to avoid breakage and the connection between the thermometer tubes 3 and 4 is thus maintained.

For all positions of the casing with respect to the head 13 of the fitting 14, the adjustment is fixed by means of the lock-nut 17. If, however, it is necessary that the casing be turned on this long axis, it is rotated somewhat on the fitting 8 and the upper threaded end of the neck 9 is provided with an arcuate rim 25 as indicated in FIGURES 1, 2, 3 and 8. The casing has in the bottom thereof a pin 26 which projects downward towards part of the boss 9 adjacent the rim 25, and the thermometer case can thus be turned in either direction until the pin 26 strikes a shoulder at the ends of the rim 25, this rim thus limiting the rotary movement of the case 1. The thermometer can therefore be adjusted with the case at an angle to the stem 2 and in any such position it can be turned to face away from the stem or to either side of the stem at will. When adjusted in crosswise or central position, the pin 26 will be midway between the ends of the rim 25.

The utility and design of the thermometer is thus very practical and permits all the adjustment needed. The two sections of the thermometer tubing 3 and 4 are always connected by the capillary tube 5, and these sections can be secured in the case 1 and stem 2 in any suitable manner. The capillary tubing is entirely housed and concealed in the pivot plug 6 uniting the two heads 12 and 13, and is thus not exposed to tampering or disturbance of any kind. The parts of the thermometer are readily assembled and can quickly be mounted in operative position with respect to a source of heat, and then easily adjusted as may be required by local conditions.

The casing has the transverse shape shown in FIGURE 8, with a rib 27 at the back and the front edges of the sides extending over as indicated at 28 to hold a plate of glass or the like in position over the tube 3.

It is also to be noted that the coil of capillary tubing 5 in the bore 7 of the pin 6 is so wound that the axis of the turns thereof extend in the same direction as the axis of rotation of this pin. The rim 19 of the head 12 has a recess 29 in line with the bore through the neck 9 for one end of the coil 5 to unite with the element 3; and the head 13 has a recess or notch 30 in its rim alined with the bore through the member 14 for the other end of the capillary tubing 5 joined to the element 4. This construction not only completely houses the tube 5, but also disposes the ends of the coil 5 properly for the junction thereof with the tubular elements 3 and 4 which the coil operatively connects.

Having described our invention, what we believe to be new is:

1. In a thermometer, the combination of a stem and a casing having an externally and internally threaded boss at one end, a member having a tubular threaded neck at one end with a bore therethrough enveloped by said boss, said member having a laterally offset portion at its opposite end, a second member having at one end a laterally offset portion coinciding with the first offset portion, a pivot pin uniting said portions, said other member having at its opposite end a tubular extension with a bore therethrough for connection with said stem, and a threaded nut enveloping the boss on the casing for engagement with said offset portions to hold said members in adjusted position, the pivot pin and said end of the case having bores therethrough in line with the bores in said neck and said second-named member, the neck of said first-named member having an arc-shaped rim presenting shoulders at its opposite ends, and the bottom of the thermometer casing having a pin extending into operative proximity to said rim to engage the shoulders at the ends thereof and limit the rotary adjustment of the casing, the casing and stem having tubular parts for containing a heat-responsive substance, and a coil of capillary tubing in the bore of said pivot pin housing said coil, and connecting said part.

2. In a thermometer, the combination of a stem and a casing having an externally and internally threaded boss at one end, a member having a tubular threaded neck at one end with a bore therethrough enveloped by said boss, said member having a laterally offset portion at its opposite end, a second member having at one end a laterally offset portion coinciding with the first offset portion, a pivot pin uniting said portions, said other member having at its opposite end a tubular extension with a bore therethrough for connection with said stem, means for engagement with said offset portions to hold said members in adjusted position, the pivot pin and said end of the casing having bores therethrough in line with the bores in said neck and said second-named member, the neck of said first-named member having an arc-shaped rim presenting shoulders at its opposite ends, and the bottom of the thermometer casing having a pin extending into operative proximity to said rim to engage the shoulders at the ends thereof and limit the rotary adjustment of the case, the casing and stem having tubular parts for containing a heat-responsive substance, and a coil of capillary tubing in the bore of said pivot pin housing said coil.

References Cited in the file of this patent

UNITED STATES PATENTS

| | | |
|---|---|---|
| 1,583,941 | Swiggart et al. | May 11, 1926 |
| 2,220,216 | Clautier | Nov. 5, 1940 |
| 2,513,144 | Cederborg | June 27, 1950 |
| 2,608,863 | Erbguth | Sept. 2, 1952 |
| 2,875,614 | Dobrin et al. | Mar. 3, 1959 |